No. 762,830. PATENTED JUNE 14, 1904.
J. G. MAGIN.
FOUNTAIN AND PENHOLDER.
APPLICATION FILED FEB. 10, 1904.
NO MODEL. 2 SHEETS—SHEET 1.
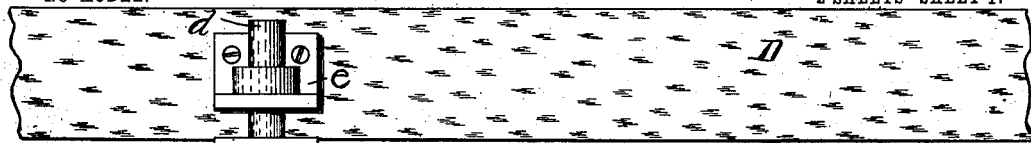
Fig. 1.
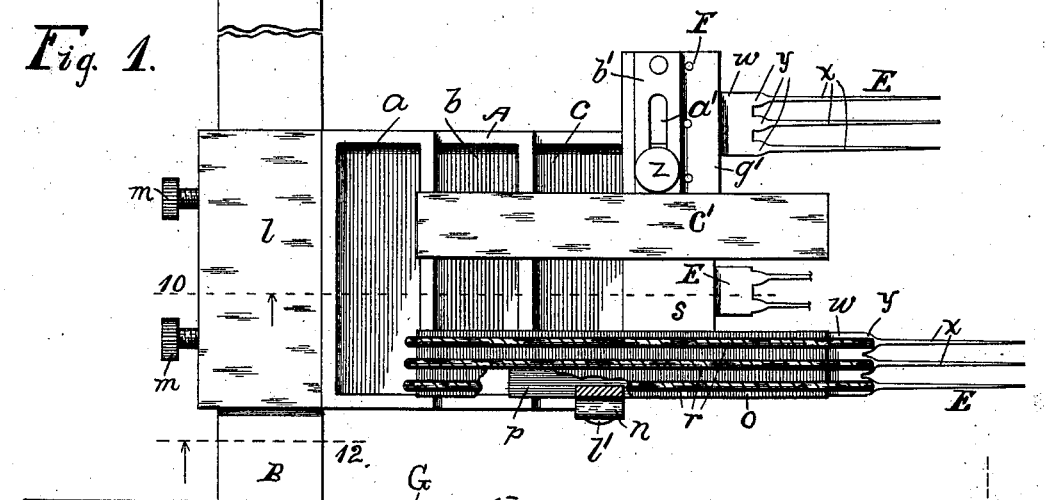
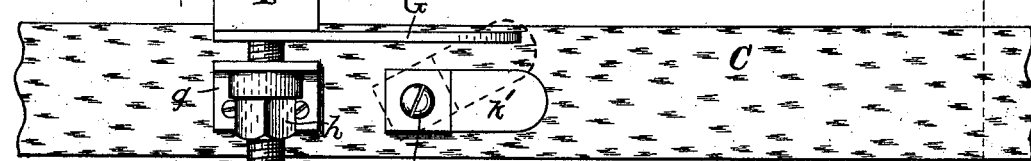
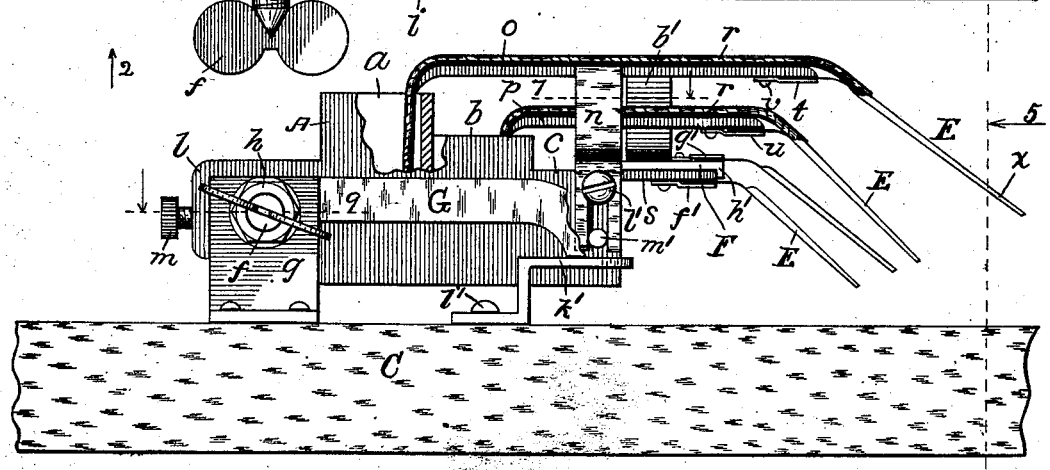
Fig. 2.
Fig. 4.
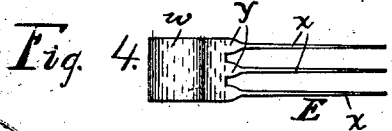
Fig. 3.
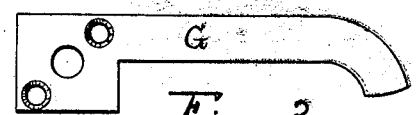
Attest:
M. B. Smith.
M. D. Phillips.
Inventor:
John G. Magin.
By E. B. Whitmore, Atty.
THE NORRIS PETERS CO., PHOTO-LITHO., WASHINGTON, D. C.

No. 762,830. PATENTED JUNE 14, 1904.
J. G. MAGIN.
FOUNTAIN AND PENHOLDER.
APPLICATION FILED FEB. 10, 1904.
NO MODEL. 2 SHEETS—SHEET 2.
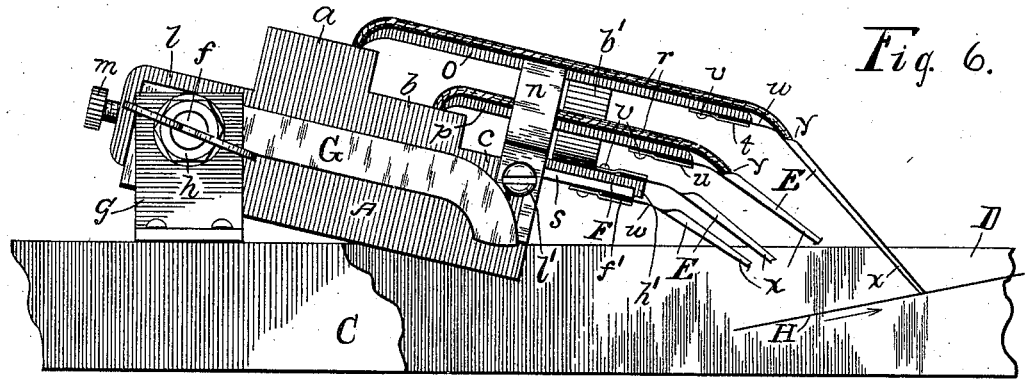
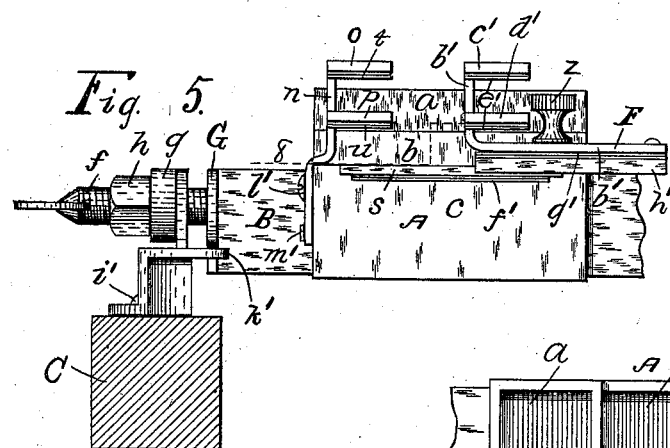
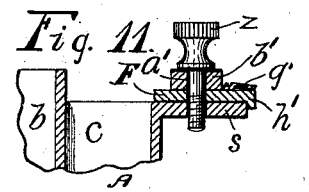
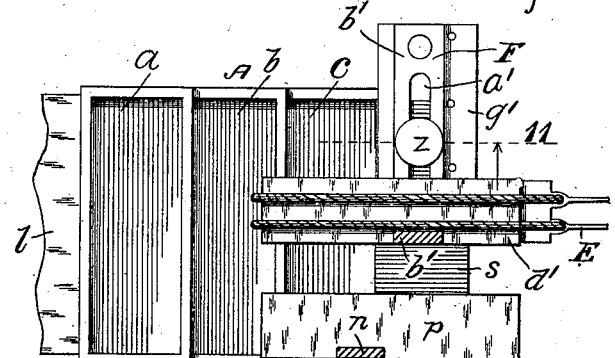
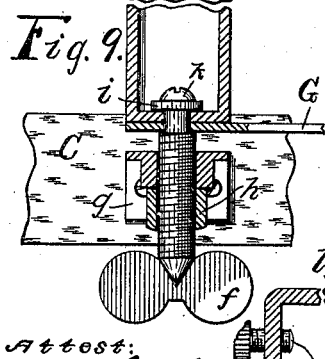
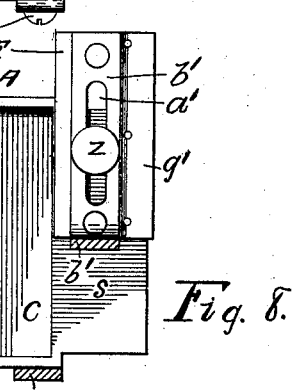
Attest:
M. B. Smith.
M. D. Phillips.
Inventor:
John G. Magin.
By E. B. Whitmore, Atty.

No. 762,830.

Patented June 14, 1904.

UNITED STATES PATENT OFFICE.

JOHN G. MAGIN, OF ROCHESTER, NEW YORK, ASSIGNOR OF ONE-HALF TO GEORGE W. HOFF, OF ROCHESTER, NEW YORK.

FOUNTAIN AND PENHOLDER.

SPECIFICATION forming part of Letters Patent No. 762,830, dated June 14, 1904.

Application filed February 10, 1904. Serial No. 192,940. (No model.)

*To all whom it may concern:*

Be it known that I, JOHN G. MAGIN, of Rochester, in the county of Monroe and State of New York, have invented a new and useful Improvement in Fountains and Penholders, which improvement is fully set forth in the following specification and shown in the accompanying drawings.

My invention is an ink-fountain and penholder, the same constituting a convenient device for ruling paper, as in producing headlines and the like in tinted inks for sheets or forms for mercantile and office use and in the make-up of stationery paper generally, the invention being hereinafter fully described, and more particularly pointed out in the appended claims, reference being had to the accompanying drawings, forming a part of this specification.

Figure 1 is a plan of the device with parts broken away and omitted. Fig. 2 is a side elevation of the same seen as indicated by arrow 2 in Fig. 1, parts being broken away and omitted. Fig. 3 shows the lifting-arm detached. Fig. 4 is a plan of a multiple pen detached. Fig. 5 is a front elevation of the device seen as indicated by arrow 5 in Fig. 2, a frame-timber being transversely sectioned on the dotted line at the point of the arrow, parts being broken away and the pens omitted. Fig. 6 is a side elevation of the device, showing the same in position of use, parts being broken away. Fig. 7 is a plan of the fountain with upper parts omitted, the section being on the horizontal dotted line 7 in Fig. 2. Fig. 8 is a plan with parts broken away and omitted, the section being on the broken dotted line 8 in Fig. 5, further showing the detail of construction. Fig. 9 is a plan of parts of the carrying-beam and some associated parts, the section being taken on the horizontal dotted line 9 in Fig. 2, parts being broken away. Fig. 10 is a vertical longitudinal section of the fountain or body of the device, taken on the dotted line 10 in Fig. 1, parts being broken away. Fig. 11 is a vertical longitudinal section of a part of the fountain and some associated parts on the dotted line 11 in Fig. 7, further showing the construction. Fig. 12 is a vertical cross-section of the carrying-beam on the dotted line 12 in Fig. 1.

Referring to the parts shown, A in the various figures is the body of the device constituting the ink-fountain, it being rectangular in form and commonly made of metal, as brass. This fountain is commonly divided by cross-partitions into three, more or less, apartments or reservoirs $a\ b\ c$, graded as to depth, for holding ruling-inks of different tints or colors. The body A is carried or supported by a horizontal metal beam B, supported upon timbers C D of a suitable holding-frame. (Not fully shown.) The carrying-beam B is usually made hollow for lightness, as shown in Figs. 9 and 12, and provided at its rear end with a rigid axial trunnion $d$, resting in a standard $e$, held by the frame-timber D, the trunnion having both axial and longitudinal motions in the standard. At its near or front end the beam is pierced by the end of a trunnion $f$, Figs. 1, 2, 5, 6, and 9, said trunnion and the trunnion $d$ being coaxial. The trunnion $f$ is threaded horizontally through a standard $g$, similar to the standard $e$, said standard $g$ being carried by the frame-timber C, a set-nut $h$ being provided for the threaded trunnion for turning up against the opposing face of the standard $g$ to hold said trunnion in positions of adjustment in the standard. The beam B is adapted in turn freely upon the reduced end of the threaded trunnion $f$, a retaining-washer $i$ and holding-screw $k$ being provided at the end of the trunnion within the beam to prevent relative longitudinal motion of the beam on the trunnion $f$. By means of the construction and the operation of the parts described it will be understood that the carrying-beam B has free axial motion on its end trunnions and that it may be finely adjusted longitudinally by means of the threaded trunnion $f$, the body A sharing in both of these movements.

The body or fountain A is formed at its rear end with a rectangular hanger $l$, Figs. 1, 2, 3, and 10, adapted to reach over and fit the carrying-beam B, holding-screws $m\ m$ being threaded through the rear part of the hanger in positions to press the beam to hold the fountain rigid with the beam. By loosening the screws $m$ $m$ the fountain may be moved laterally along the beam to any position desired. The fountain is provided at one side with a removable bifurcated standard $n$, Figs. 1, 2, and 5 to 8, supporting at its upper end a fixed table $o$ for carrying the conducting-yarn for the ink, said table constituting also a holder for a ruling-pen E, Fig. 4, at its right-hand projecting end, as shown. The left end of the table or part $o$ overhangs the main or deepest reservoir $a$ of the fountain, as shown, being reduced and bent downward at its extreme end to give an easy bend to the strands $r$ of conducting-yarn held thereon. The standard $n$ also holds a short fixed ledge $p$ beneath and parallel with the table $o$, constituting a penholder and serving also for carrying strands of yarn $r$. The left end of the ledge $p$ slightly overhangs the middle reservoir $b$ of the fountain, it being reduced and curved downward at its extreme end, as in the case of the table $o$, to give an easy downward bend to the incumbent strands $r$ of conducting-yarn. The body A is provided with a rigid horizontal pin $m'$, Fig. 2, in position to stand between the lower ends of the branches of the standard $n$ when the latter is put in place upon the body, the standard being secured in position by a fastening-screw $l'$ between the branches and threaded in the body A. The screw $l'$ and the pin $m'$ together serve to hold the standard truly in position upon the body A, and to remove the standard, with its incumbent parts $o$ and $p$, from the fountain the screw is turned slightly back to release the standard.

The fountain A is formed at its front end with a horizontal shelf or ledge $s$, adapted to hold at its front edge one or more ruling-pens E, said shelf being beneath the ledge $p$ and even with the upper edge or surface of the shallow reservoir $c$ and in one piece with the body A, the vertical distances between the parts $s$ and $p$ and the parts $o$ and $p$ being substantially equal. The table $o$ and the shelf $p$ are provided at their right-hand or front ends, respectively, with spring clasps or jaws $t$ $u$, secured to their under surfaces by simple fasteners $v$. These clasps serve to hold the pens E, the thin shanks or flat parts $w$ of the pens being forced edgewise into the narrow spaces between the clasps and the opposing parts whenever it is wished to put a pen in place for use.

The pens E are commonly made with three, more or less, tines or marking-points $x$, as shown, the tines being tapered and channeled or having the form of hollow troughs or ducts, downward along which the ink flows to the points of the pens and to the paper. At their upper ends the tines are expanded laterally to form small cups $y$, into which the ends of the strands of yarn $r$, respectively, lead, serving to deliver the ink into the hollow tines $x$.

The opposite ends of the conducting-strands of yarn $r$ extend downward into the inks carried in the various apartments of the fountain, as shown, the fluids being carried upward and along the strands by capillary attraction and delivered to the pens, as stated.

The shelf $s$ of the fountain holds a laterally-movable slide F, Figs. 1, 2, 5, 6, 7, 8, and 11, secured to place by a thumb-screw $z$, occupying a slot $a'$ in the slide and threaded in the shelf, as appears in Fig. 11. This slide F comprises a bar $b'$, bent upward at its inner or forward end to hold rigidly at its upper end a table $c'$ and an under short shelf or ledge $d'$, as shown. This table and the shelf constitute penholders and serve to carry strands of conducting-yarn $r$, both being similar to and on levels with the corresponding table $o$ and shelf $p$, above described, these parts $o$ $p$ and $c'$ $d'$ constituting two pairs of penholders and yarn-supports, both alike, one pair being rigid and the other pair movable. The table $c'$ and the shelf $d'$ have pen-holding spring-clasps $e'$ $e'$ for receiving and holding pens E, said parts $c'$ and $d'$ and the attached pens being laterally adjustable along the front shelf $s$. The shelf $s$ is also designed for holding marking-pens, it being provided on its under surface with a lengthened spring clasp or holder $f'$, Figs. 2, 5, and 6, for one or more pens. Also the slide F is designed for a penholder, it being provided with a long spring-clasp $g'$, secured to its upper surface by simple fasteners $v$. The slide F is formed with a pendent overhanging lip or rib $h'$, Figs. 5, 6, and 11, in front of the outer edge of the shelf $s$, which lip or rib acts as a controlling-guide for the slide in its lateral movements and prevents the slide from becoming twisted or from turning horizontally on the shelf during its lateral adjustments thereon. By removing the thumb-screw $z$ the slide F, with its incumbent parts $c'$ and $d'$, may be removed bodily from the fountain A, and the table $o$ and associated shelf $p$ may likewise be removed from the fountain by loosening the clamping-screw $l'$ and withdrawing the slotted standard $n$.

When the device is out of use and raised to bring the pens out of action and away from the paper H, the fountain A is substantially horizontal, as shown in Figs. 2 and 5, and when in position of use the whole device inclines, as appears in Fig. 6. To determine these positions of the device and to manipulate the device, a lifting-arm G, Figs. 1, 2, 3, 5, 6, and 9, is provided, secured to the forward end of the carrying-beam B. This arm is curved downward at its free end in position to rest upon the adjacent frame-timber C in the tilted position of the body A. A swinging rest $k'$, Figs. 1, 2, and 5, is held pivotally upon the timber C by a fastening-screw $i'$, so as to be turned either under the downturned end of the lifting-arm G or away from under the arm, as may be required. To lift the pens out of use, the arm G is turned upward, as with the thumb and finger, sufficiently to allow the rest $k'$ to be turned under the downturned end of the arm G, as shown in Figs. 2 and 5 and by dotted lines in Fig. 1, the fountain then being substantially level, and when it is wished to let the pens down to touch the sheet of paper H to be ruled the rest is turned from beneath the arm G, the latter then resting directly upon the timber C.

The material of which the ruling-pens E are usually made is a very thin flexible metal, as brass, so that the pens may be bent at the thin shank $w$ in a manner to cause the points of the pens to mildly press the paper being ruled.

All the parts $o$, $p$, $c'$, and $d'$ are adapted to hold upon them strands $r$ of conducting-yarn when pens are inserted in said parts, and when pens are used in the shelf $s$, as stated, the strands of yarn to supply them with ink are placed across said shelf, one end of each strand dipping into the adjacent reservoir $c$ and the other end resting upon the pen, as previously stated. Also when pens are inserted in the slide F the ink-supplying yarns are made to rest upon and across the slide, drawing ink from the near reservoir $c$.

What I claim as my invention, and desire to secure by Letters Patent, is—

1. A fountain and penholder consisting of a hollow body having a series of shelves projecting at one end of the body in different horizontal planes, and adapted at their outer ends for holding ruling-pens, and strands of fluid-conducting material resting upon the shelves, with one end of each strand extending into the hollow of the body and the opposite end communicating with a pen.

2. A fountain and penholder consisting of a body for holding ink, divided into separate apartments, a series of shelves in different horizontal planes extending from points adjacent to said apartments outward to overhang said body, spring-clasps at the outer ends of the shelves for holding pens, and strands of conducting material extending from the interiors of said apartments of the body and communicating with the pens, the said body being held to turn upon an axis.

3. A fountain and penholder consisting of a hollow body having a series of shelves projecting from the body, and adapted at their outer ends for holding pens, and strands of fluid-conducting material resting upon the shelves, with one end of each strand extending into the hollow of the body and the opposite end communicating with a pen, said hollow body being mounted upon a carrying-beam and adapted to be shifted longitudinally thereon.

4. A device of the kind described, consisting of a hollow body having a series of fixed shelves projecting therefrom in different horizontal planes and adapted at their outer ends for holding ruling-pens, and strands of fluid-conducting material carried by the shelves with one end of each strand extending into the hollow of the body and the opposite end communicating with a pen, an adjustable slide held by a shelf and carrying a pair of laterally-adjustable pen-holding shelves similar to said fixed shelves, and means for holding the slide in positions of lateral adjustment.

5. A device of the kind described, comprising a hollow body for holding inks, a carrying-beam holding said body shiftably thereon, a pair of standards, a trunnion in one end of the beam resting in one of said standards and having axial and longitudinal movements therein, a trunnion threaded through the other standard and pivotally engaging the opposite end of the beam, the said trunnions being coaxial, and the beam being adapted to turn thereon and means for adjusting said beam longitudinally, said hollow body having a series of penholders projecting therefrom and overhanging the same.

6. A device of the kind described, comprising a hollow body for holding ink, a standard secured removably to said hollow body and supporting penholders above the hollow body, a shelf projecting from the hollow body, a shiftable slide with standard supported by said shelf and carrying penholders, and means for supporting said hollow body.

7. A fountain and penholder consisting of a hollow body having a plurality of compartments graded as to depth for holding ink, a series of pen-holding elements held by and extending from the hollow body in different horizontal planes, and parts for carrying conductors for the ink.

8. A fountain and penholder consisting of a hollow body for holding ink, and two independent sets of pen-holding elements, one fixed to and extending from said hollow body, and the other laterally adjustable on said body, each set having its holding members in different horizontal planes, said pen-holding elements serving also as carriers for the ink-conductors.

9. A fountain and penholder consisting of a hollow body for holding ink, a series of penholders, in pairs, extending from said body in different horizontal planes, and means for conducting ink out of the hollow body, one pair of the penholders being adapted to be moved laterally with reference to the other pair, and both pairs detachable from the hollow body.

In witness whereof I have hereunto set my hand, this 1st day of February, 1904, in the presence of two subscribing witnesses.

JOHN G. MAGIN.

Witnesses:
 ENOS B. WHITMORE,
 MINNIE SMITH.